(12) United States Patent
Benhase et al.

(10) Patent No.: US 7,536,593 B2
(45) Date of Patent: May 19, 2009

(54) APPARATUS, SYSTEM, AND METHOD FOR EMERGENCY BACKUP

(75) Inventors: Michael Thomas Benhase, Tucson, AZ (US); YuCheng Hsu, Tucson, AZ (US); David Ray Kahler, Tucson, AZ (US); Karl Allen Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 10/794,725

(22) Filed: Mar. 5, 2004

(65) Prior Publication Data

US 2005/0210316 A1 Sep. 22, 2005

(51) Int. Cl.
*G06F 11/00* (2006.01)
(52) U.S. Cl. ..................................... 714/20
(58) Field of Classification Search .................. 714/20
See application file for complete search history.

(56) References Cited

U.S. PATENT DOCUMENTS

| | | | | |
|---|---|---|---|---|
| 4,564,900 A | * | 1/1986 | Smitt | 709/212 |
| 4,819,154 A | * | 4/1989 | Stiffler et al. | 714/20 |
| 5,276,860 A | * | 1/1994 | Fortier et al. | 714/6 |
| 5,412,801 A | * | 5/1995 | de Remer et al. | 714/20 |
| 5,418,921 A | | 5/1995 | Cortney et al. | 395/425 |
| 5,454,099 A | * | 9/1995 | Myers et al. | 714/6 |
| 5,530,801 A | * | 6/1996 | Kobayashi | 714/13 |
| 5,555,371 A | * | 9/1996 | Duyanovich et al. | 714/13 |
| 5,555,389 A | | 9/1996 | Satoh et al. | 395/427 |
| 5,602,805 A | * | 2/1997 | Chigita | 369/13.02 |
| 5,604,862 A | * | 2/1997 | Midgely et al. | 714/6 |
| 5,638,509 A | * | 6/1997 | Dunphy et al. | 714/20 |
| 5,675,816 A | * | 10/1997 | Hiyoshi et al. | 713/324 |

(Continued)

FOREIGN PATENT DOCUMENTS

JP 09-212424 8/1997

OTHER PUBLICATIONS

Raid5 Performance with Distributed Sparing, Alexander Thomasian, Senior Member, IEEE, and Jai Menon, Senior Member, IEEE; IEEE Transactions on Parallel and Distributed Systems, vol. 8, No. 6, Jun. 1997.

(Continued)

*Primary Examiner*—Robert Beausoliel
*Assistant Examiner*—Amine Riad
(74) *Attorney, Agent, or Firm*—Kunzler & McKenzie (57) ABSTRACT

An apparatus, system, and method quickly backs up data in an emergency situation and reduces battery backup dependence. The apparatus may include a backup module and a dedicated computer readable storage device. The backup module interfaces with system memory and selectively transmits modified data to the storage device in response to a detected system failure. The dedicated storage device stores the modified data around the outer edge of a hard disk in order to increase write performance. The system may include the backup module, the storage device, a plurality of client devices, and a plurality of storage devices. The method includes storing modified and unmodified data, detecting a system failure, and transmitting modified data stored in a memory module to a dedicated computer readable backup device. Upon rebooting the device, the method may include restoring the modified data to the system memory and destaging the modified data to the plurality of storage devices.

16 Claims, 6 Drawing Sheets

U.S. PATENT DOCUMENTS

| | | | | |
|---|---|---|---|---|
| 5,708,668 | A | | 1/1998 | Styczinski ................. 371/40.1 |
| 5,708,820 | A | * | 1/1998 | Park et al. ................... 712/323 |
| 5,748,874 | A | | 5/1998 | Hicksted et al. ........ 395/182.22 |
| 5,761,404 | A | * | 6/1998 | Murakami et al. ............. 714/15 |
| 5,799,141 | A | * | 8/1998 | Galipeau et al. .............. 714/13 |
| 5,819,020 | A | * | 10/1998 | Beeler, Jr. ...................... 714/5 |
| 5,828,823 | A | | 10/1998 | Byers et al. ............ 395/182.22 |
| 5,832,170 | A | * | 11/1998 | Keery et al. ................... 386/32 |
| 5,835,955 | A | | 11/1998 | Dornier et al. .............. 711/162 |
| 5,974,425 | A | * | 10/1999 | Obermarck et al. ......... 707/202 |
| 6,035,347 | A | | 3/2000 | Beardsley et al. ............. 710/52 |
| 6,141,773 | A | * | 10/2000 | St. Pierre et al. .............. 714/20 |
| 6,167,338 | A | * | 12/2000 | De Wille et al. .............. 701/51 |
| 6,185,367 | B1 | * | 2/2001 | Keery et al. ................. 386/122 |
| 6,202,121 | B1 | * | 3/2001 | Walsh et al. ................. 711/100 |
| 6,243,795 | B1 | | 6/2001 | Yang et al. .................. 711/159 |
| 6,292,808 | B1 | * | 9/2001 | Obermarck et al. ......... 707/202 |
| 6,336,174 | B1 | * | 1/2002 | Li et al. ....................... 711/162 |
| 6,397,308 | B1 | * | 5/2002 | Ofek et al. .................. 711/162 |
| 6,591,376 | B1 | * | 7/2003 | VanRooven et al. ........... 714/36 |
| 6,802,025 | B1 | * | 10/2004 | Thomas et al. ................. 714/15 |
| 6,981,177 | B2 | * | 12/2005 | Beattie ......................... 714/20 |
| 7,076,481 | B2 | * | 7/2006 | Osborne et al. ................. 707/3 |
| 7,100,072 | B2 | * | 8/2006 | Galipeau et al. ............... 714/6 |
| 7,152,180 | B2 | * | 12/2006 | Shoaib et al. ................... 714/4 |
| 2002/0004885 | A1 | | 1/2002 | Francis et al. ............... 711/118 |
| 2002/0194429 | A1 | | 12/2002 | Chiu et al. ................... 711/118 |
| 2003/0028819 | A1 | | 2/2003 | Chiu et al. ...................... 714/5 |
| 2007/0204151 | A1 | * | 8/2007 | Schnackenberg et al. .... 713/161 |

OTHER PUBLICATIONS

Free Transactions with Rio Vista, David E. Lowell and Peter M. Chen, 16th ACM Symposium on Operating Systems Principles. Oct. 1997.

* cited by examiner

APPARATUS, SYSTEM, AND METHOD FOR EMERGENCY BACKUP

BACKGROUND OF THE INVENTION

1. Field of the Invention

The present invention relates to data backup systems and more particularly relates to systems and methods for emergency data backup.

2. Description of the Related Art

The explosion of data created by modern business systems such as e-business is motivating companies of all sizes to make storage a strategic investment priority. As storage takes precedence, two major concerns have emerged: business continuity and business efficiency. Business continuity requires storage that supports data availability so employees, customers and trading partners can access data continuously through reliable, disaster-tolerant systems. Business efficiency, where storage is concerned, requires investment protection, reduced total cost of ownership, and high performance and manageability.

In order to maintain the large amounts of data created and collected in these systems, storage area networks (SANs) have been developed. The Storage Network Industry Association (SNIA) defines a SAN as a network whose primary purpose is the transfer of data between computer systems and storage elements. A SAN may comprise a communication infrastructure, which provides physical connections; and a management layer, which organizes the connections, storage elements, and computer systems so that data transfer is secure and robust. A SAN may also be a storage system comprising storage elements, storage devices, computer systems, and/or appliances, plus all control software, communicating over a network.

Commonly, a storage area network includes a plurality of storage devices, such as tape drives or hard disk drives, connected over a network with a storage controller. The storage controller is generally a server that is configured to process read and write requests from a host and a plurality of connected client machines. The client machines often operate with a variety of operating systems. In large computing environments, the storage area network is an ideal solution for providing large amounts of storage and scalable server or storage controller performance.

Typically, in a storage area network environment, a client machine requests data from the storage controller. The storage controller then retrieves the data from the particular storage device that contains the requested data, often referred to as a home location. The storage controller then sends the data to the client machine. If the client machine modifies the data, the storage controller returns the modified data to the home location. Typically, the client machine awaits a response from the storage controller indicating that the read or write operation has completed. This controller-client interaction consumes storage controller resources and performance.

In order to improve storage controller performance and decrease resource usage, large amounts of RAM may be used to temporarily stage data. By staging data, the storage controller may indicate to the client machine that the read or write operation has been completed, and thereby recover system resources. By relying on RAM to temporarily stage the data, large corporations and institutions have been able to greatly increase data throughput and response time. However, in the event of a disaster, such as a power loss, the contents of the RAM are lost.

With the purpose of overcoming the power limitation of RAM memory, storage controllers are often coupled to an uninterruptible power supply (UPS). Generally, there are two types of UPS systems. The first is a standby power system (SPSs). An SPS monitors the power line and switches to battery power as soon as the SPS detects a problem. The switch to battery, however, can require several milliseconds, during which time the computer is not receiving any power. The second type of UPS is an on-line UPS. The on-line UPS avoids momentary power lapses by constantly providing power, even when the AC source is functioning properly. In general, on-line UPSs are much more expensive than SPSs.

One alternative solution to expensive UPSs is to dump or destage the data stored in memory to a local storage device, such as a hard disk drive. By dumping the data to a local disk, the modified data in the RAM is saved and a shut-down process may be completed earlier, thereby requiring a smaller, less expensive UPS system. One solution has been to write the modified data to a boot disk or a disk that contains an operating system. This solution requires no additional hardware, but with the increasing amounts of RAM in current storage controllers, this may be a slow process. Additionally, the shut-down process requires the use of the boot disk, and therefore the modified data dump competes with the shut-down process and therefore requires extra time. Time directly translates to product cost because a larger UPS system is required in order to supply power to the system while the shut-down process runs.

Another solution has been to implement a separate device to connect a data dump disk directly to the RAM or other memory module. While this system is effective and eliminates the conflicts with the boot disk, the device adds to the maintenance and cost of the storage controller.

SUMMARY OF THE INVENTION

The present invention has been developed in response to the present state of the art, and in particular, in response to the problems and needs in the art that have not yet been fully solved by currently available emergency backup systems. Accordingly, the present invention has been developed to provide a process, apparatus, and system for emergency backup that overcome many or all of the above-discussed shortcomings in the art.

The apparatus for emergency backup is provided with a logic unit containing a plurality of modules configured to functionally execute the necessary steps of backing up data in an emergency situation. These modules in the described embodiments include a memory module configured to store modified and unmodified data and a backup module configured to detect a system failure and transmit modified data stored in the memory module to a dedicated computer readable backup device. In one embodiment, the dedicated computer readable backup device may comprise a computer readable peripheral selected from the group consisting of a hard disk drive, a universal serial bus storage device, a floppy disk, an optical storage disk, a flash memory storage device, and a network attached storage drive.

Alternatively, the computer readable backup device may comprise a hard disk drive formatted into sectors and configured to store the modified data in a plurality of sectors located around the outer edge of the hard disk. In one embodiment, the memory module comprises a first portion configured to store unmodified data and a second portion configured to store modified data. Additionally, the emergency backup apparatus may comprise a data module configured to maintain a time stamp and a version number of data stored on the dedicated computer readable backup device.

In one embodiment, the backup module is further configured to update the data module in response to a detected system failure. In a further embodiment, the apparatus may comprise a restore module configured to interface with the data module and transmit data from the dedicated computer readable backup device to the memory module in response to a detected system failure.

A system of the present invention is also presented for emergency backup. In one embodiment, the system may comprise a communications network, a data storage controller coupled to the communications network is configured to process input/output data requests for a plurality of storage devices. The data storage controller is provided with a memory module, a central processing unit, a bootable storage device, and a backup module configured to detect a system failure and transmit modified data stored in the memory module to a dedicated computer readable backup device.

A computer readable storage medium comprising computer readable code configured to carry out a method for emergency backup is also presented. In one embodiment, the method may comprise storing modified and unmodified data, detecting a system failure, and transmitting modified data stored in a memory module to a dedicated computer readable backup device. In a further embodiment, the method comprises initializing the dedicated readable backup device, receiving the modified data, and storing the data in a plurality of sectors located substantially around the outer edge of the dedicated computer readable backup device.

The method may further include maintaining a time stamp and a version number of data stored on the dedicated computer readable backup device. In a further embodiment, the method may comprise updating the time stamp and version number in response to a detected system failure. Additionally, the method may comprise restoring data from the dedicated computer readable backup device to the memory module in response to a detected system failure, and transmitting restored data from the memory module to a plurality of home locations.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
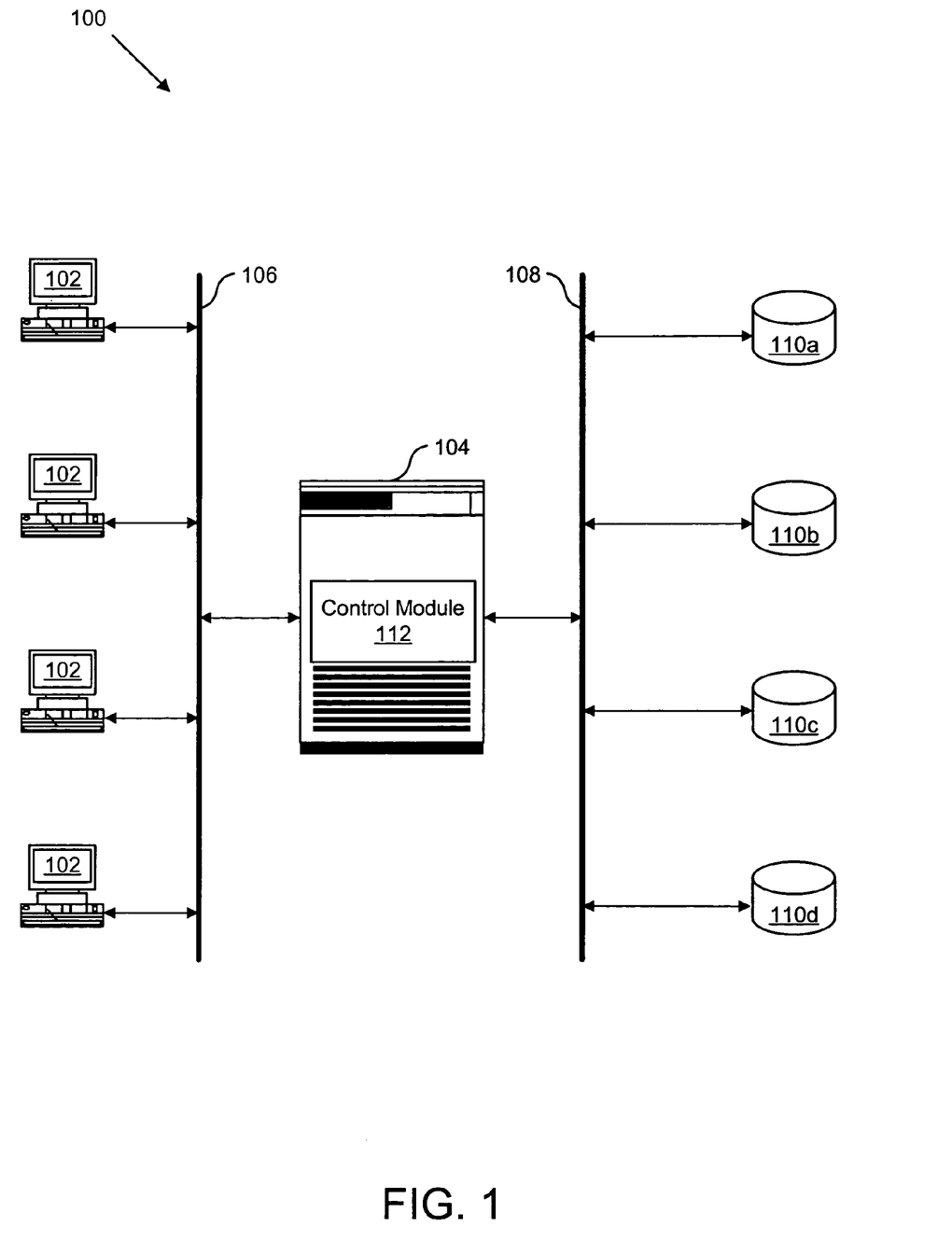
FIG. 1 is a schematic block diagram illustrating one embodiment of a data storage system in accordance with the present invention.

FIG. 1 is a schematic block diagram illustrating one embodiment of a system 100 for data storage. The system 100 may comprise a plurality of client machines 102, a storage controller 104, and a plurality of storage devices 110a, 110b, 110c, 110d (collectively referred to as storage devices 110). The client machines 102 may be coupled to the storage controller 104 by a communications network 106. In one embodiment, the communications network 106 comprises a local area network (LAN). Alternatively, the communications network 106 may comprise a wide-area network, virtual private network, wireless local area network, storage area network, or the like. In a further embodiment, the communications network 106 may comprise FIBRE, FICON, ULTA SCSI, ESCON, or similar interconnect technology.

The storage controller 104 may be coupled to the storage devices 110 by a storage area network 108 (SAN). The storage controller 104 is configured to support a plurality of connection interfaces such as, but not limited to, Fibre Channel, 2 Gigabit Fibre Channel/FICON™, Ultra SCSI and ESCON®. Alternatively, the SAN 108 may be easily replaced with the communications network 106. In one embodiment, the storage controller 104 comprises a control module 112.

Figure 2:
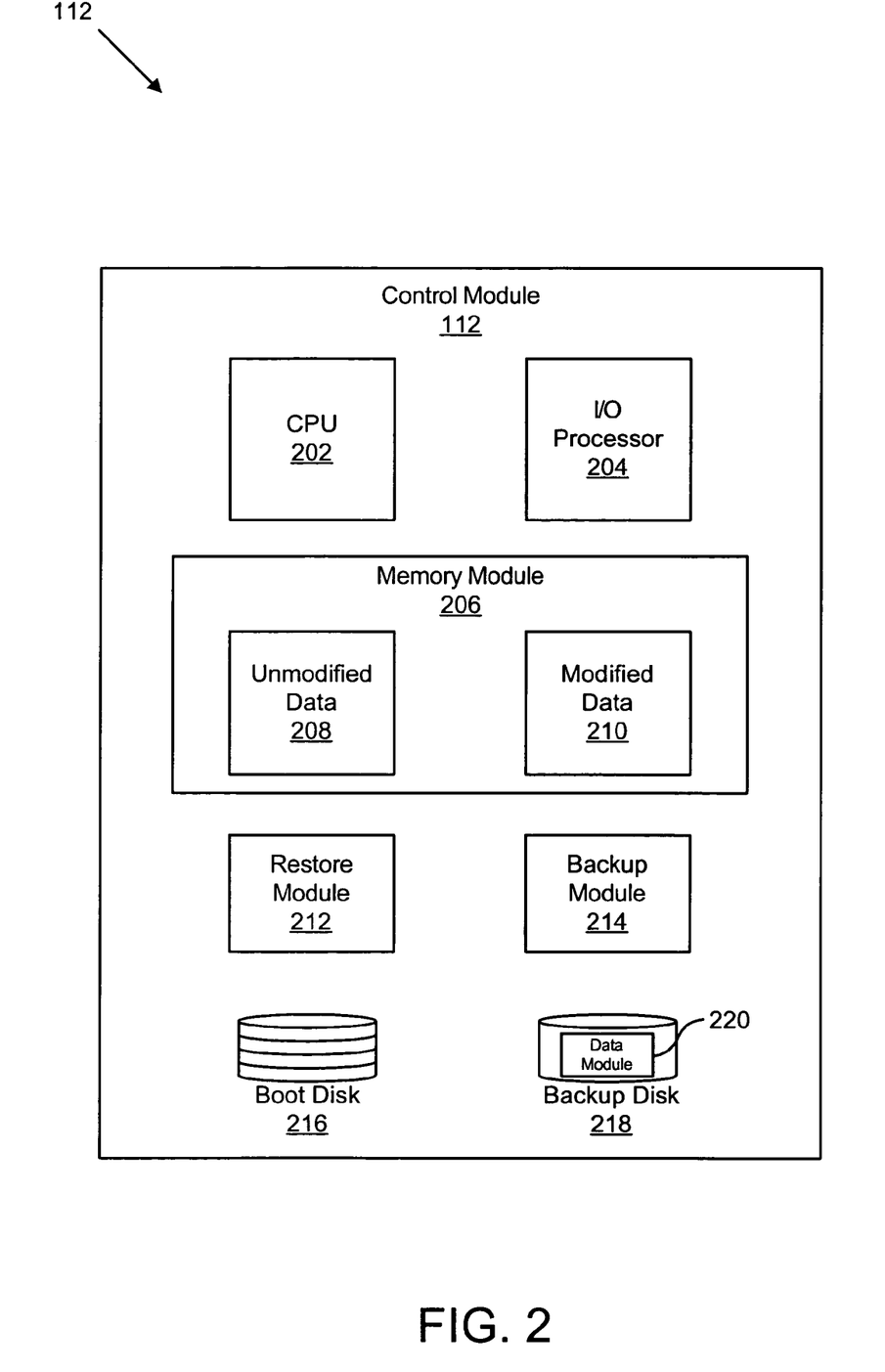
FIG. 2 is a schematic block diagram illustrating one embodiment of a backup module in accordance with the present invention.

FIG. 2 is a schematic block diagram illustrating one embodiment of the control module 112 in accordance with the present invention. The control module 112 includes a central processing unit 202 (CPU), an I/O processor 204, and a memory module 206. In one embodiment, the memory module 206 comprises RAM memory containing unmodified data 208 and modified data 210. As client machines 102 request and modify data, the control module 112 stages the requests in the memory module 206. In a further embodiment, the control module 112 may comprise a restore module 212, a backup module 214, a boot disk 216, and a backup disk 218.

The backup module 214 may be configured to detect a system failure and transmit modified data 210 to the backup disk 218. The backup disk 218 may comprise a dedicated hard disk drive. Alternatively, the backup disk 218 may comprise a computer readable storage device such as, but not limited to, a universal serial bus storage device, a floppy disk, an optical storage disk, a flash memory storage device, or a network attached storage drive.

The backup disk 218 also preferably comprises a data module 220 configured to maintain information regarding the timestamp and version of the modified data stored on the backup disk 218. For example, upon detecting a system failure, the backup module 214 transmits the modified data 210 to the backup disk 218 and then updates the data module 220. Additionally, the backup disk 218 may be configured to receive data and write the data to the outer edge of the disk or platter surface. By writing to the outer edge of the platter surface, data throughput is increased, and the amount of time the control module 112 must run on a battery backup system (not shown) is decreased. Writing to the outer edge of the backup disk 218 will be discussed in greater detail below with respect to FIGS. 3 and 4. Alternatively, the backup module 214 may be configured to transmit commands to the backup disk 218 requiring the modified data to be written to the outer edge of the disk or platter surface.

The restore module 212 may be configured to interface with the data module 220 and transmit the modified data stored on the backup disk 218 to the memory module 206 in response to a detected system failure. Once transmitted, the restore module 212 may be configured to update the data module 220 in order to indicate that the data has been restored.

Figure 3:
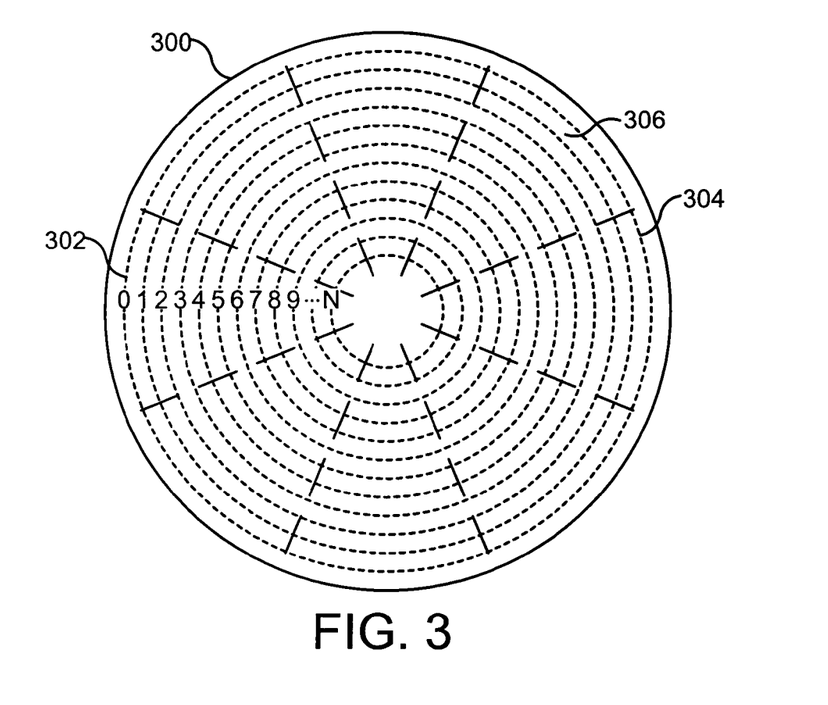
FIG. 3 is a schematic block diagram illustrating one embodiment of a representative formatted computer readable backup device in accordance with the present invention.

FIG. 3 depicts one embodiment of a representative electronic storage media surface 300 similar to the surface of the backup disk 218 employed in the control module 112. The illustrated platter surface 300 shows visual demarcations indicating the electronic formatting that may be performed on the disk 218.

The depicted surface 300 is formatted to include a plurality of concentric tracks 302, which are numbered 0 through N and are indicated by the concentric dashed circles in the figure. Current technology allows each surface 300 to be formatted to include thousands of tracks 302 per inch and tens of thousands of tracks 302 across the usable surface 300 of the disk 218. The platter surface 300 depicted is further segmented into sectors 304, which are shown as darkened segments of the platter surface 300. A sector 304 may be electronically demarcated on the platter surface 300 by an electronic sector gap 306, or possibly by an embedded servo, indicated by the radial dashed lines in the figure. In the depicted embodiment, the platter surface 300 has been segmented into 8 sectors 304 per track 302, for a total of 8(N+1) sectors 304. If N is 11, for example, then the depicted platter surface 300 would be formatted to include 96 sectors 304 using standard recording (12 tracks 302 with 8 sectors 304 per track 302).

A platter surface 300 may alternately be formatted to include zones that define sets of tracks 302. Each zone may be segmented into an increasing number of sectors 304 toward the outer edge of the platter surface 300. Using the depicted embodiment as an example, the tracks 302 numbered 0-3 might be one zone formatted to include 28 sectors 304 per track 302. The tracks 302 numbered 4-7 might be a second zone formatted to include 20 sectors 304 per track 302. The tracks 302 numbered 8-N might be a third zone formatted to include 16 sectors 304 per track 302. Such a manner zoned recording increases the overall number of available sectors 304. In the case where N is 11, zoned recording allows the platter surface 300 to be formatted to include 256 sectors 304 over the 12 tracks 302 (112 sectors 304) in the first zone, 80 sectors 304 in the second zone, and 64 sectors 304 in the third zone).

Figure 4:
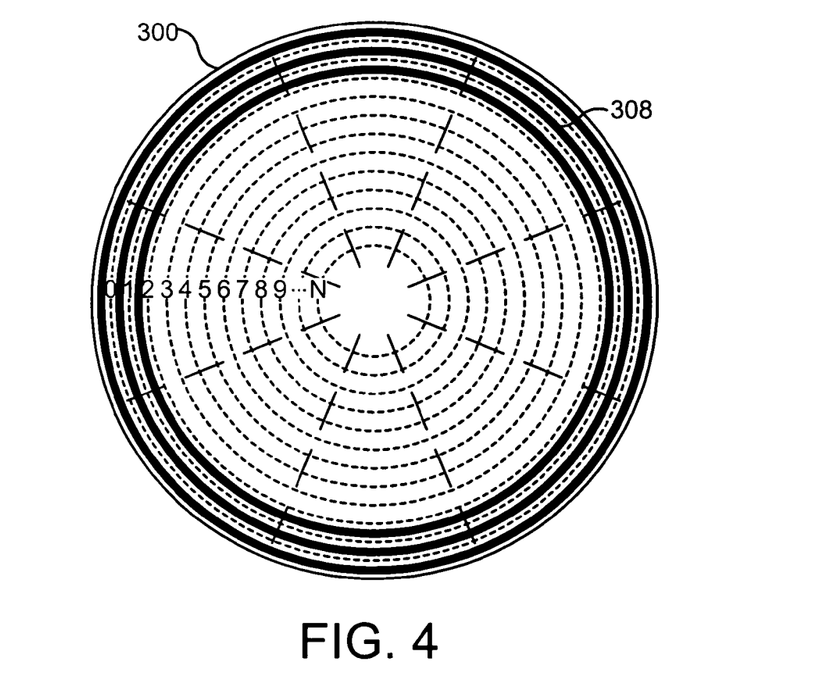
FIG. 4 is a schematic block diagram illustrating one embodiment of a representative computer readable backup device storing data in accordance with the present invention.

In order to increase performance in the transfer of the modified data 210 to the backup disk 218, data is in one embodiment written to the outer edge of the platter surface 300. FIG. 4 is a schematic block diagram illustrating one embodiment of data written to the outer edge of the platter surface 300. Solid concentric circles 308 represent data written to the outer edge of the platter surface 300. Data read/write performance is increased around the outer edge 308 of the platter surface 300 due to the constant angular velocity and therefore increased linear velocity around the outer edge 308.

Additionally, more sectors 304 are present around the outer edge of the platter surface 300.

Figure 5:
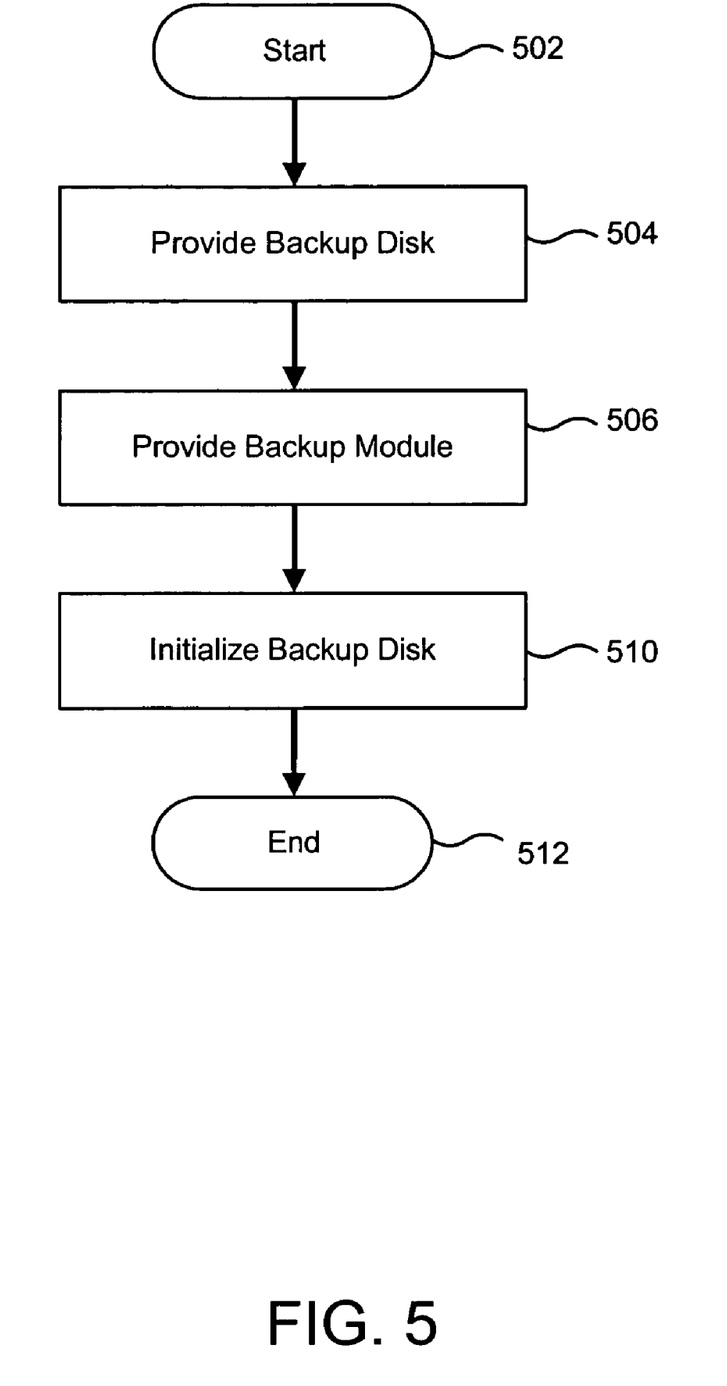
FIG. 5 is a schematic flow chart diagram illustrating one embodiment of a method for initializing a dedicated computer readable backup device in accordance with the present invention.

FIG. 5 is a schematic flow chart diagram illustrating one embodiment of a method 500 for initializing the backup disk 218. The method 500 starts 502 and a backup disk is provided 504. In one embodiment, the backup disk 218 may be coupled directly to the memory module 206 with a dedicated bus (not shown), such as an ATA or SCSI bus. Alternatively, the bus may be shared with the boot disk 216. The method 500 continues and the backup module 214 is provided. In one embodiment, the backup module 214 may comprise microcode configured to operate on a motherboard or planar. Alternatively, the backup module 214 may be configured as part of an operating system located on the boot disk 216. The backup disk 218 is then initialized 510. Initializing 510 the backup disk may comprise formatting the backup disk 218, or wiping existing data from the backup disk 218. The method 500 then ends 512.

Figure 6:
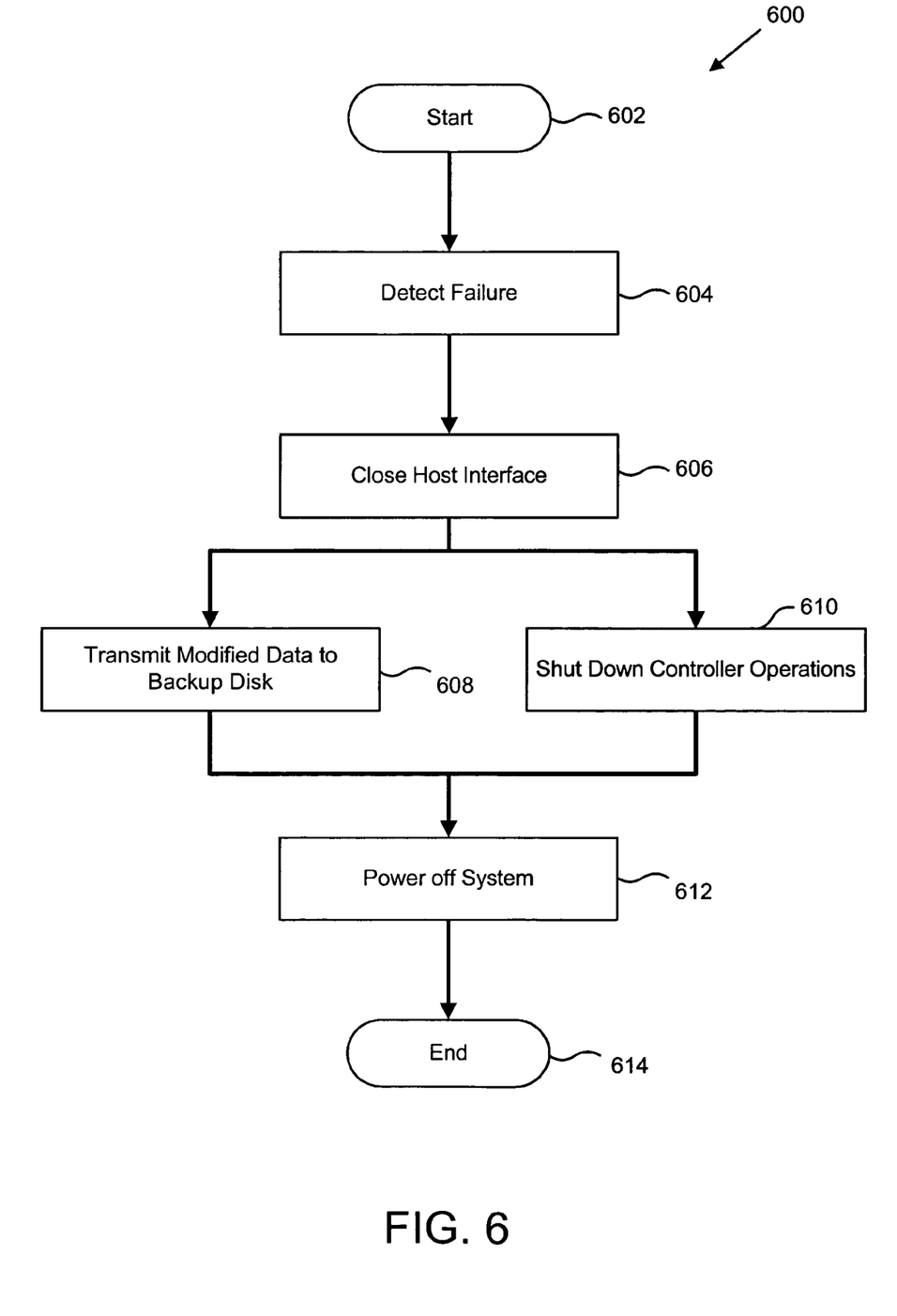
FIG. 6 is a schematic flow chart diagram illustrating one embodiment of a method for emergency backup in accordance with the present invention.

FIG. 6 is a schematic flow chart diagram illustrating one embodiment of a method 600 for emergency backup in accordance with the present invention. The method 600 starts 602 and a failure is detected 604. The control module 112 then closes 606 the host interface or client machine 102 interface. In one embodiment, closing 606 the host interface comprises notifying the host of the pending off-line status of the storage controller 104. Additionally, the control module 112 stops receiving read/write requests from the host or client machines 102.

The backup module 214 then transmits 608 modified data to the backup disk 218. In one embodiment, the modified data 210 is written to the outer edge 308 of the platter surface 300 of the backup disk 218 in order to increase performance and reduce the amount of time required of the battery system. Additionally, the backup module 214 updates the time stamp and version information stored in the data module 220. In a further embodiment, transmitting 608 data comprises a sequential write of modified 210 data to the backup disk 218. In parallel, the control module 112 shuts down 610 storage controller 104 operations. Once the modified data 210 has been stored on the backup disk 218, the control module 112 powers off 612 the storage controller 104. The method 600 then ends 614.

Figure 7:
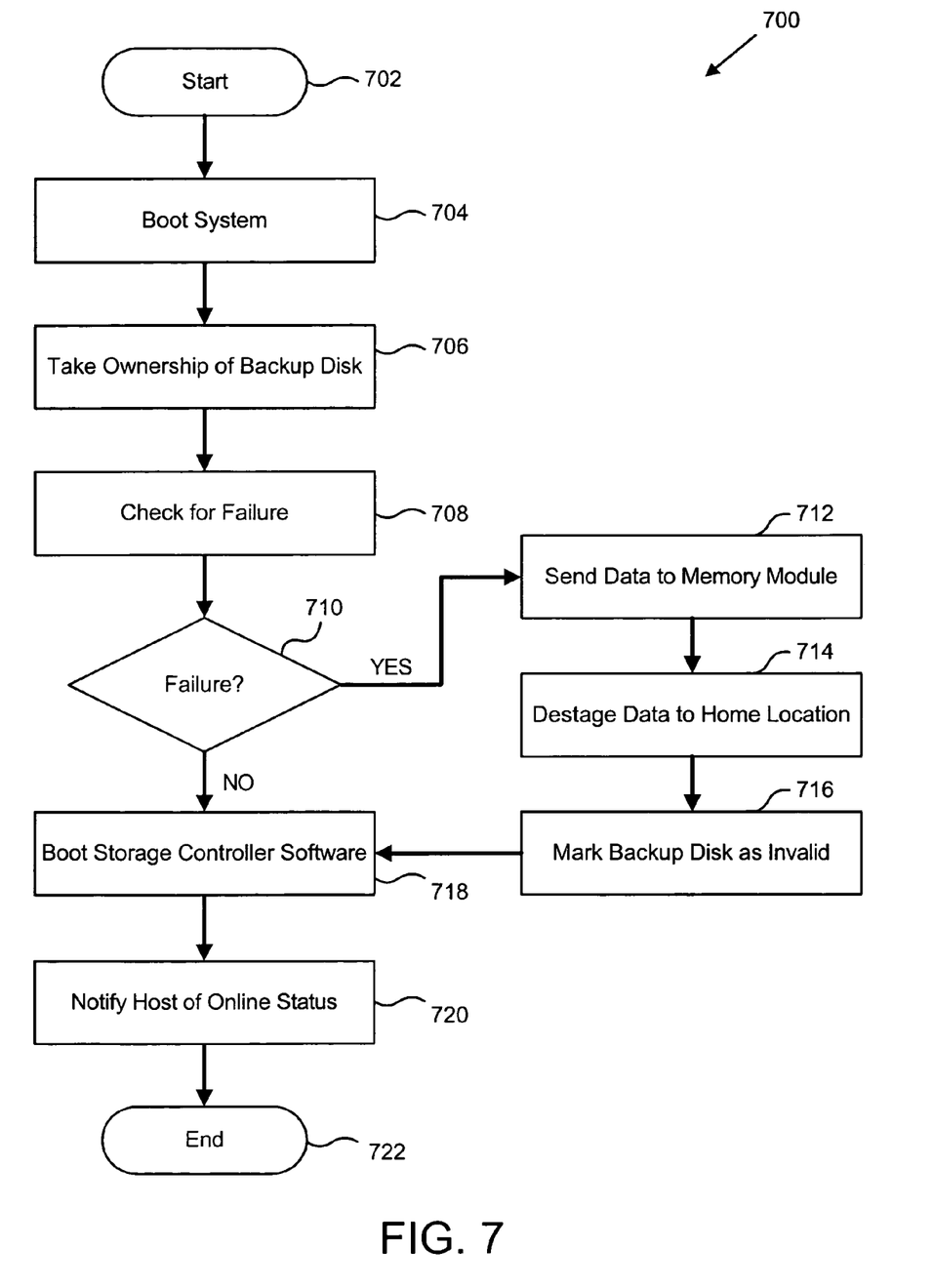
FIG. 7 is a schematic flow chart diagram illustrating one embodiment of a method for restoring data in accordance with the present invention.

FIG. 7 is a schematic flow chart diagram illustrating one embodiment of a combined method 700 for booting, detecting a system failure, and restoring data according to the present invention. The method 700 starts 702 and the system is booted 704. The backup module 214 takes 706 ownership of the backup disk 218. In one embodiment, taking 706 ownership of the backup disk 218 comprises dedicating backup disk 218 resources for receiving modified data 210 from the memory module 206. The restore module 212 then interfaces with the data module 220 and checks 708 for a prior failure. In a further embodiment, checking 708 for a prior failure comprises comparing the time stamp and version information with the storage controller 104 or alternatively with time stamp and version information stored on the boot disk 216.

If a failure is detected 710, the restore module 212 reads data from the backup disk 218 to the memory module 206. Once the data is restored 712 to the memory module 206, the control module 112 may destage 714 the data to the home location. In one embodiment, the data stored in the backup disk 218 comprises modified data 210 and corresponding home location. For example, restored data may specify a home location 110a, 110b, 110c, or 110d. The control module 112 sends the data to the corresponding home location and then the restore module 212 marks 716 the backup disk as invalid. In one embodiment, marking 716 the backup disk as invalid comprises updating the data module 220 to indicate that data on the disk has been restored and may be erased.

Once the modified data 210 has been restored and destaged to the proper home location 110, the storage controller software may be booted 718. The storage controller then enables the host or client machine 102 interface and notifies 720 the host or client machine 102 of the online storage controller 104 status. The method 700 then ends. If no failure is detected 710, the boot process continues as described above with reference to step 718. In a further embodiment, the methods 500, 600, 700 may be performed on a personal computer by providing 504 a dedicated backup disk 218, and providing 506 a backup module 214.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for efficient data backup, the apparatus comprising:
   a memory module embodied in a control module and storing modified and unmodified data; and
   a backup module detecting a system failure and in response to detecting the system failure closing a host interface and concurrently selectively transmitting modified data stored in the memory module to a dedicated computer readable backup device and shutting down the control module and memory module, wherein the dedicated computer readable backup device comprises a hard disk drive formatted into sectors of a standard size, the hard disk storing the modified data in a plurality of the sectors located at three outermost tracks of the hard disk.

2. The apparatus of claim 1, wherein the backup module transmits the modified data directly to the computer readable backup device without passing through a system processor.

3. The apparatus of claim 1, wherein the dedicated computer readable backup device further comprises a data module maintaining a time stamp and a version number of data stored on the dedicated computer readable backup device.

4. The apparatus of claim 3, wherein the backup module further updates the data module in response to a detected system failure.

5. The apparatus of claim 1, further comprising a restore module interfaceing with the data module and transmitting data from the dedicated computer readable backup device to the memory module in response to a detected system failure.

6. The apparatus of claim 5, wherein the restore module further updates the data module in response to a detected system failure.

7. A system for efficient data backup, the system comprising:
   a communications network;
   a data storage controller coupled to the communications network and processing input/output data requests for a plurality of storage devices, the data storage controller having a memory module, a central processing unit, and a bootable storage device; and
   a backup module detecting a system failure and in response to detecting the system failure closing a host interface to the communications network and concurrently selectively transmitting modified data stored in the memory module to a dedicated computer readable backup device and shutting down the data storage controller, wherein the dedicated computer readable backup device comprises a hard disk drive formatted into sectors, each sector having a data field having a standard size, the hard disk storing the modified data in a plurality of sectors at three outermost tracks of the hard disk.

8. The system of claim 7, wherein the dedicated computer readable backup device further comprises a data module maintaining a time stamp and a version number of data stored on the dedicated computer readable backup device.

9. The system of claim 7, further comprising a restore module interfaceing with the data module and transmitting data from the dedicated computer readable backup device to the memory module in response to a detected system failure.

10. The apparatus of claim 9, wherein the restore module further updates the data module in response to a detected system failure.

11. A computer readable storage medium comprising computer readable code that carries out a method for efficient data backup, the method comprising:
   storing modified and unmodified data;
   detecting a system failure; and
   closing a host interface, concurrently selectively transmitting modified data stored in a memory module to a dedicated computer readable backup device, and shutting down a data storage controller in response to detecting the system failure, wherein the dedicated computer readable backup device comprises a hard disk drive formatted into sectors of a standard size, the hard disk storing the data in a plurality of sectors located at three outermost tracks of the hard disk.

12. The computer readable storage medium of claim 11, wherein the method further comprises initializing the dedicated computer readable backup device.

13. The computer readable storage medium of claim 11, wherein the method further comprises maintaining a time stamp and a version number of data stored on the dedicated computer readable backup device.

14. The computer readable storage medium of claim 11, wherein the method further comprises updating the data module in response to a detected system failure.

15. The computer readable storage medium of claim 11, wherein the method further comprises restoring data from the dedicated computer readable backup device to the memory module in response to a detected system failure.

16. The computer readable storage medium of claim 11, wherein the method further comprises transmitting restored data from the memory module to a plurality of home locations.

* * * * *